(No Model.)

T. McDONALD, Jr.
NUT LOCK.

No. 464,758. Patented Dec. 8, 1891.

Witnesses:
Lucilla Stevenson,
J. K. Barton

Inventor.
Thomas McDonald Jr
by J. H. Stevenson
Atty

THE NORRIS PETERS CO., PHOTO-LITHO., WASHINGTON, D. C.

UNITED STATES PATENT OFFICE.

THOMAS McDONALD, JR., OF ALLEGHENY, PENNSYLVANIA.

NUT-LOCK.

SPECIFICATION forming part of Letters Patent No. 464,758, dated December 8, 1891.

Application filed June 16, 1891. Serial No. 396,494. (No model.)

*To all whom it may concern:*

Be it known that I, THOMAS McDONALD, Jr., a citizen of the United States, residing at Allegheny, in the county of Allegheny and State of Pennsylvania, have invented certain new and useful Improvements in Nut-Locks; and I do hereby declare the following to be a full, clear, and exact description of the invention, such as will enable others skilled in the art to which it pertains to make and use the same, reference being had to the accompanying drawings, which form a part of this specification.

The object of my invention is a nut-lock, the nature of which will be fully explained hereinafter.

Figure 1:
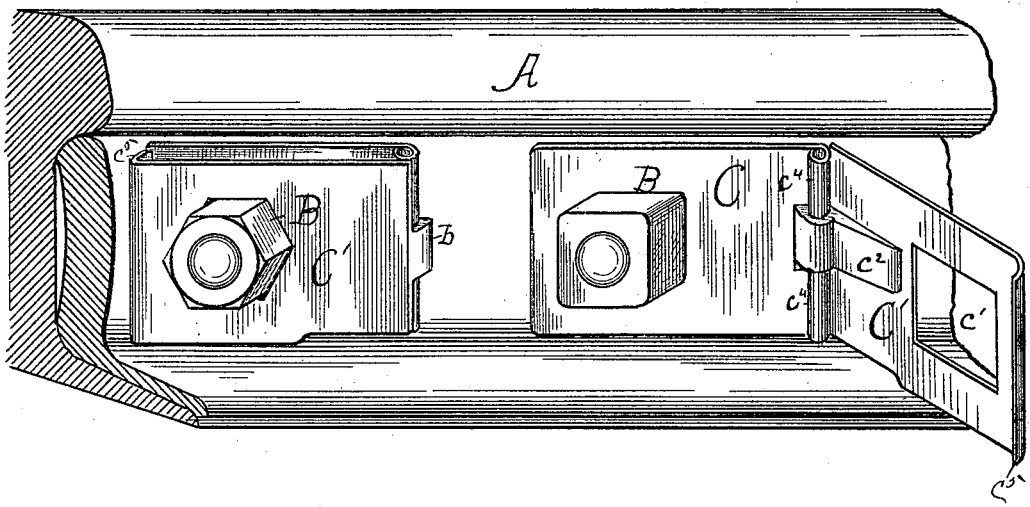
Figure 2:
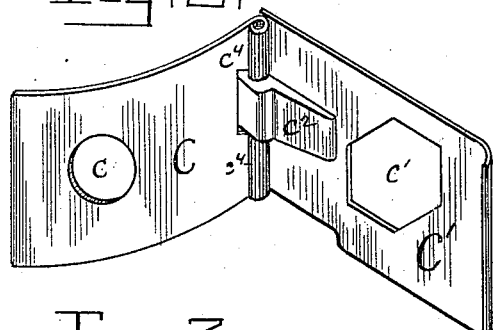
Figure 3:
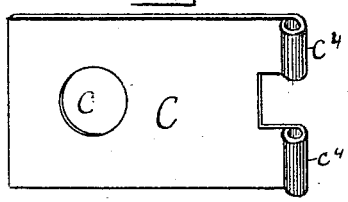
Figure 4:
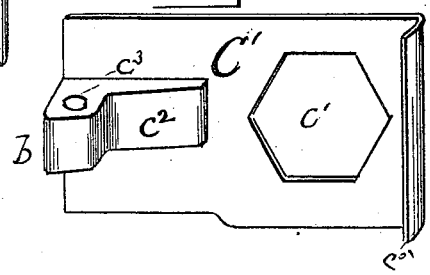

In the accompanying drawings, Figure 1 represents a railroad-rail on which are two of my nut-locks, one open and the other closed. Fig. 2 represents my nut-lock opened up, showing the two wings separated, but swinging on a hinge, where they unite. Fig. 3 is the spring-washer part of my nut-lock, and Fig. 4 is the nut-lock proper.

A is a railroad-rail.

B is a nut. (Shown in place on the rail.)

C is the spring-washer part of my nut-lock.

$c$ is the bolt-hole in the washer C. This washer is made a little concave on the side next to the rail for a well-known purpose—a spring. The end that joins the part C' of the washer C is shaped as seen at $c^4$ in Fig. 3, so as to form a hinge in conjunction with the part $c^2$ of the lock C'. This part $c^2$ is made or cast integral with the balance of the part C'. This part $c^2$ is enlarged, as seen at $b$, so as to afford a key-hole $c^3$ and also form a kind of cam. The free end of the plate C' is bent, as at $c^5$, and when the plate is turned to lock the nut, this bent edge $c^5$ bears against the plate or washer C and holds the two plates apart.

$c'$ is the opening in the lock C' for the nut B to pass through. When the washer is pressed tightly up against the rail, the cam part on $b$ (seen in Fig. 4) will press tightly against the rail also when the lock part C' is partly closed, but not when open, as seen in Figs. 1 and 2; but when the lock C' is nearly closed against the washer, this part or cam $b$ will serve to hold or send it into position, as also seen in Fig. 1.

The openings $c$ and $c'$ may be made either round, oval, octagon, or any other shape to conform to the shape of the nuts on the bolt.

It will be seen that such a nut-lock as I show and describe will hold the nuts firmly in place, so that they cannot come off by any amount of agitation or friction.

Having thus described my invention, what I claim, and desire to secure by Letters Patent, is—

In a nut-lock, the combination of a plate or washer C, having an aperture $c$ for the reception of a bolt, and a recess formed in one end, the edges of the plate on both sides of the recess being bent upon themselves to form eyes or sockets $c^4$, a locking-plate C', having an aperture $c'$ to receive the nut on the bolt and provided with the longitudinal flange $c^2$, which has one end enlarged and fitted in the recess in the plate or washer C, the outer end of the plate C' being bent at $c^5$, and a pin extending through the enlarged portion of the flange $c^2$ and having its ends fitted in the sockets $c^4$, whereby when the plate C' is turned to engage the nut the tapering portion of the flange and the bent portion $c^5$ of the plate rest against the plate or washer and keep the two plates separate and parallel and the nut is held firmly in place, substantially as described.

In testimony that I claim the foregoing I hereunto set my signature this 11th day of June, A. D. 1891.

THOMAS McDONALD, JR. [L. S.]

In presence of—
 JOHN PEDDICORD,
 J. K. BARBOUR.